(12) United States Patent
Vinogradov et al.

(10) Patent No.: US 8,245,937 B2
(45) Date of Patent: Aug. 21, 2012

(54) METHOD AND APPARATUS FOR ESTIMATING EXPOSURE TIME FOR IMAGING-BASED BARCODE SCANNERS

(75) Inventors: Igor Vinogradov, New York, NY (US); Adithya Krishnamurthy, Sunnyside, NY (US); Miroslav Trajkovic, Centereach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 371 days.

(21) Appl. No.: 12/549,060

(22) Filed: Aug. 27, 2009

(65) Prior Publication Data

US 2011/0049242 A1   Mar. 3, 2011

(51) Int. Cl.
  *G06K 19/06* (2006.01)
(52) U.S. Cl. .................. 235/462.25; 235/462.1
(58) Field of Classification Search ........... 235/462.1, 235/462.11, 462.35, 462.37, 462.41, 462.42, 235/462.43, 462.25
See application file for complete search history.

(56) References Cited

U.S. PATENT DOCUMENTS

| 6,152,368 A | 11/2000 | Olmstead et al. |
| 6,899,272 B2 * | 5/2005 | Krichever et al. ....... 235/462.37 |
| 2007/0164115 A1 | 7/2007 | Joseph et al. |

OTHER PUBLICATIONS

International Search Report and Written Opinion dated Oct. 4, 2010 in related case PCT/US2010/042033.
International Preliminary Report on Patentability for International Application No. PCT/US2010/042033 mailed on Mar. 8, 2012.

* cited by examiner

*Primary Examiner* — Karl D Frech
(74) *Attorney, Agent, or Firm* — Nong-Qiang Fan

(57) ABSTRACT

A method and apparatus for estimating an optimized exposure time for an imaging-based barcode scanner. The method includes (1) determining a SNR decodability function that enables a decodability value be determined from a signal-to-noise ratio; (2) determining a blur decodability function that enables a decodability value be determined from a blur value; (3) measuring a blur and a signal-to-noise ratio for an image captured with a first exposure time; and (4) determining an optimized exposure time based on the measured blur, the measured signal-to-noise ratio, and a combined decodability function that depends upon both the SNR decodability function and the blur decodability function.

16 Claims, 6 Drawing Sheets

METHOD AND APPARATUS FOR ESTIMATING EXPOSURE TIME FOR IMAGING-BASED BARCODE SCANNERS

FIELD OF THE DISCLOSURE

The present disclosure relates generally to imaging-based barcode scanners.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Systems that read and decode bar codes employing charged coupled device (CCD) or complementary metal oxide semiconductor (CMOS) based imaging systems are typically referred to hereinafter as imaging systems, imaging-based bar code readers, or imaging scanners.

Imaging systems electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Imaging systems that include CCD, CMOS, or other imaging configurations comprise a plurality of photosensitive elements (photosensors) or pixels typically aligned in an array pattern that could include a number of arrays. The imaging-based bar code reader systems employ light emitting diodes (LEDs) or other light sources for illuminating a target object, e.g., a target bar code. Light reflected from the target bar code is focused through a lens of the imaging system onto the pixel array. As a result, the focusing lens generates an image from its field of view (FOV) that is projected onto the pixel array. Periodically, the pixels of the array are sequentially read out creating an analog signal representative of a captured image frame. The analog signal is amplified by a gain factor, by for example, an operational amplifier. The amplified analog signal is digitized by an analog-to-digital converter. Decoding circuitry of the imaging system processes the digitized signals representative of the captured image frame and attempts to decode the imaged bar code.

In some of the existing imaging scanners, the exposure time for the pixel array are determined by auto-exposure algorithms. Some of these auto-exposure algorithms are designed mainly to enhance the image visibility or contrast. When imaging scanners are used to read barcodes on moving objects with different moving speed, it is desirable to have auto-exposure algorithms that can optimize the exposure time based both the contrast and the blur of an image.

SUMMARY

In one aspect, the invention is directed to a method of estimating an optimized exposure time for an imaging-based barcode scanner. The method includes (1) determining a SNR decodability function that enables a decodability value be determined from a signal-to-noise ratio; (2) determining a blur decodability function that enables a decodability value be determined from a blur value; (3) measuring a blur and a signal-to-noise ratio for an image captured with a first exposure time; and (4) determining an optimized exposure time based on the measured blur, the measured signal-to-noise ratio, and a combined decodability function that depends upon both the SNR decodability function and the blur decodability function.

Implementations of the invention can include one or more of the following advantages. The disclosed method of estimating an optimized exposure time for an imaging-based barcode scanner can improve the decoding performance of the barcode scanner when it is used to read barcodes on moving objects with different moving speeds. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
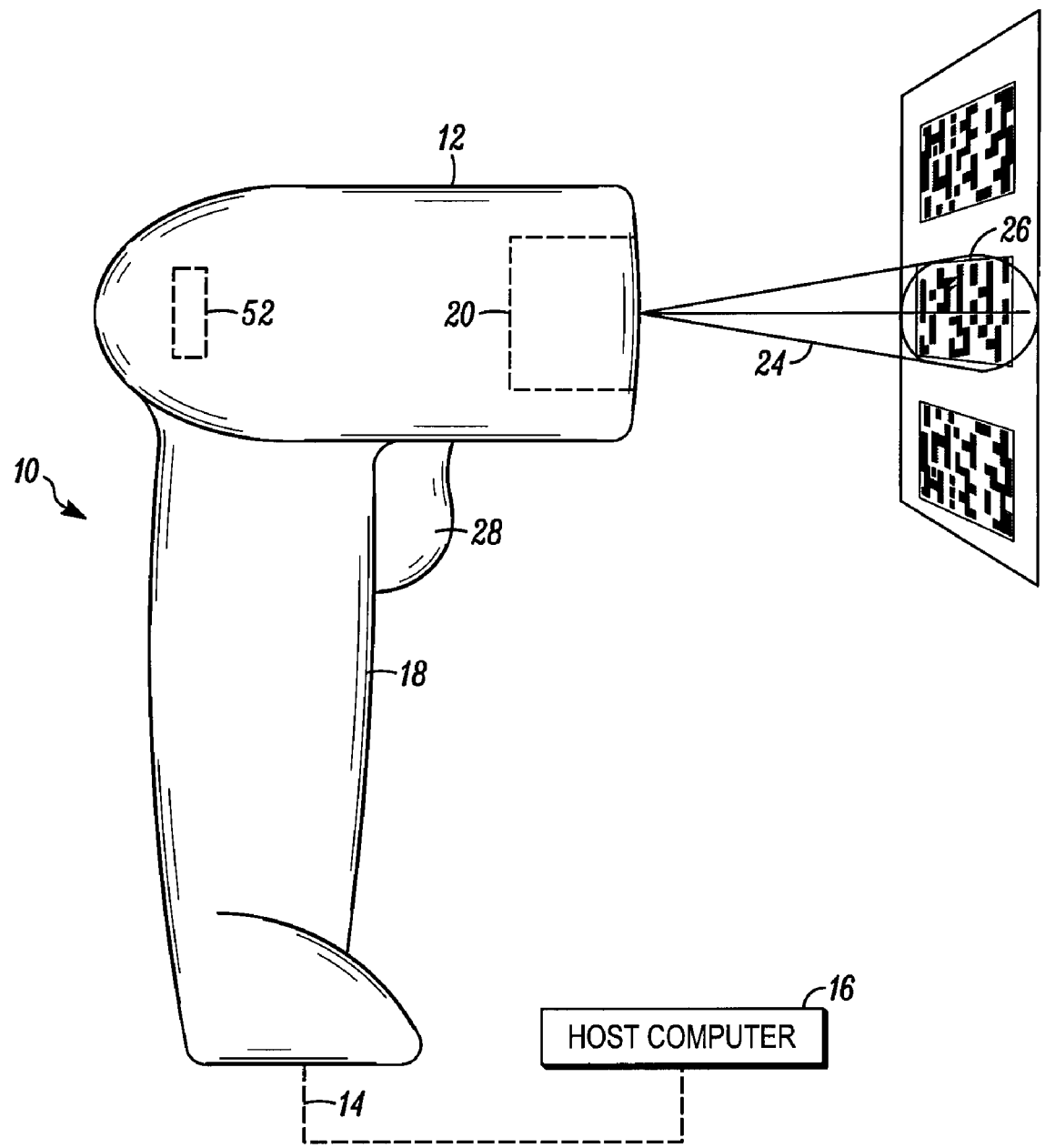
FIG. 1 is a side elevation view of an imaging scanner constructed in accordance with one example embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An imaging system 10 includes an imaging scanner 12 in communication 14 either through hard-wire or over-the-air (remote communication) to a host computer 16 as shown schematically in FIG. 1. The imaging scanner 12, in addition to imaging both 1D and 2D bar codes and postal codes, is also capable of capturing images and signatures. In one exemplary embodiment of the present invention, the imaging scanner 12 is a hand held portable imager supported in a housing 18 that can be carried and used by a user walking or riding through a store, warehouse, or plant for imaging bar codes for stocking and inventory control purposes.

However, it should be recognized that the imaging system 10 of the present invention, to be explained below, may be advantageously used in connection with any type of scanner or imaging device, be it portable or stationary. It is the intent of the present invention to encompass all such scanners and imagers.

Internal to the imaging scanner 12 is a scan engine 20. The scan engine 20 includes an illumination source 22 such as a light emitting diode (LED) or bank of LEDs for projecting light 24 at a target object 26 such as a bar code. The imaging scanner 12 can be automatically enabled, continuously enabled, or enabled by engaging a trigger 28, which initiates the projection of the light 24 in the hand-held system 10 as it is directed by a user toward the target object 26.

Figure 2:
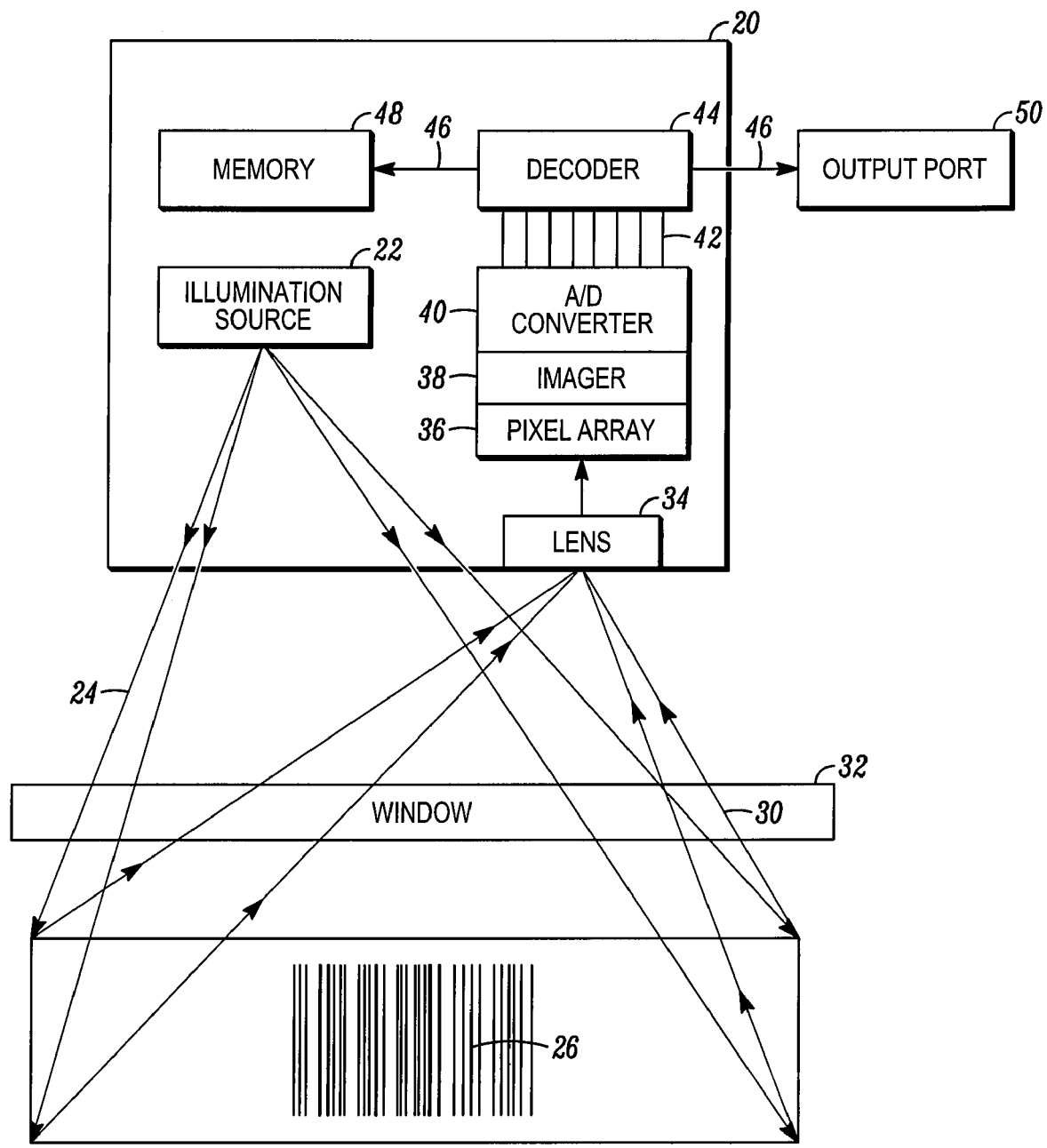
FIG. 2 is a schematic diagram illustrating a scan engine located within the imaging scanner of FIG. 1.

FIG. 2 is a schematic illustration of the scan engine 20 associated with the imaging scanner 12. Reflected light 30 from the target object 26 passes through a window 32 located in the housing 18 of the imaging scanner 12 onto a focusing lens 34 internal to the scan engine 20. The lens 34 focuses the reflected light onto a pixel array 36 of an imager element 38. The imager element 38 includes photosensitive elements such as the imaging pixel array 36 that could be for example, a charged coupled device (CCD) array or complementary metal oxide semiconductor (CMOS) array. The imager element 38 also includes an analog-to-digital (A/D) converter 40 for converting an analog signal produced by the imager element 38 over to the digital domain.

A bus connection 42 provides a communication link between the imager element 38 and a decoder 44. The bus connection 42 is a high-speed (8) bit parallel interface for providing a digital signal to the decoder 44 representative of the captured image frame. The decoder 44 processes the digitized signals and attempts to decode the target object 26 into decoded information 46. The decoded information 46 can be stored locally by the scan engine 20 in memory 48 and/or communicated to a peripheral device (not shown) such as a monitor or remote computer through an output port 50.

Figure 3:
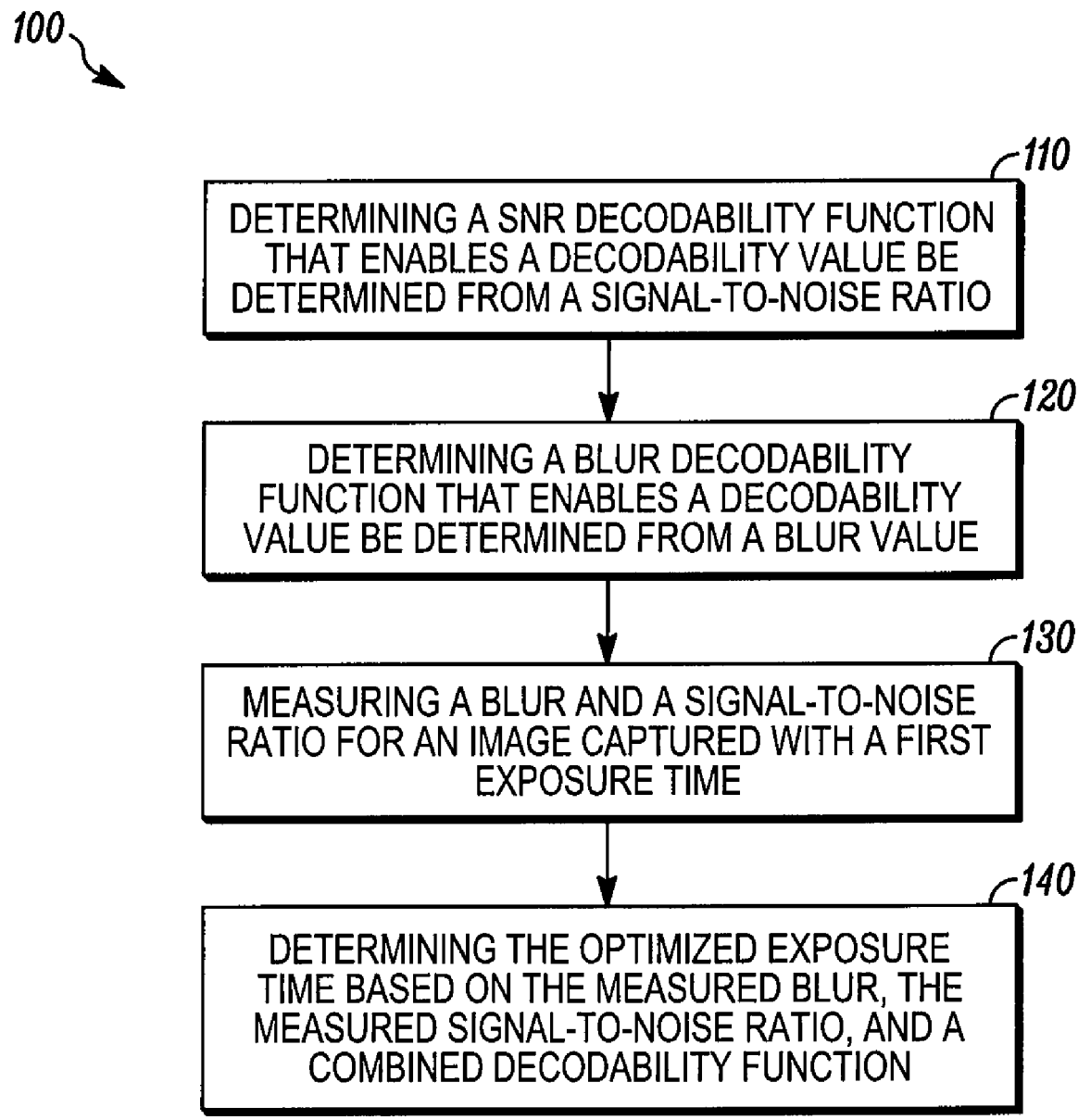
FIG. 3 depicts a method of estimating an optimized exposure time for an imaging-based barcode scanner in accordance with some embodiments.

FIG. 3 depicts a method 100 of estimating an optimized exposure time for an imaging-based barcode scanner in accordance with some embodiments. The method 100 includes blocks 110, 120, 130, and 140.

At the block 110, a SNR decodability function is determined. The SNR decodability function is a function that enables a decodability value be determined from a signal-to-noise ratio. The decodability is a figure of merit that measures how easy to decode the barcode in a captured image. For example, the figure of merit for using as the decodability value can be the number of cycles or the average time required for a microprocessor to decode the barcode in a captured image under certain standard conditions or experimental settings. In one implementation, the decodability value can be determined experimentally by measuring the average time required for a barcode reader to decode the barcode in a captured image under certain standard conditions or experimental settings.

In one experimental setting, 100 barcodes are decoded, the number of barcodes that are successfully decoded is counted, and the average time to decode a barcode can be estimated. In a first example, assume that 80 barcodes are successfully decoded and 20 barcodes fail to decoded, and further assume that it takes 0.2 second on average to decode a barcode successfully and it takes 1.0 second on average for a barcode reader to deem a barcode as failed to decode, then, the average time to decode a barcode is (0.2×80+1.0×20)/80=0.4 second. In a second example, assume that that 20 barcodes are successfully decoded and 80 barcodes fail to decoded, and further assume that it takes 0.4 second on average to decode a barcode successfully and it takes 1.0 second on average for a barcode reader to deem a barcode as failed to decode, then, the average time to decode a barcode is (0.4×20+1.0×80)/20=4.4 second.

Figure 4:
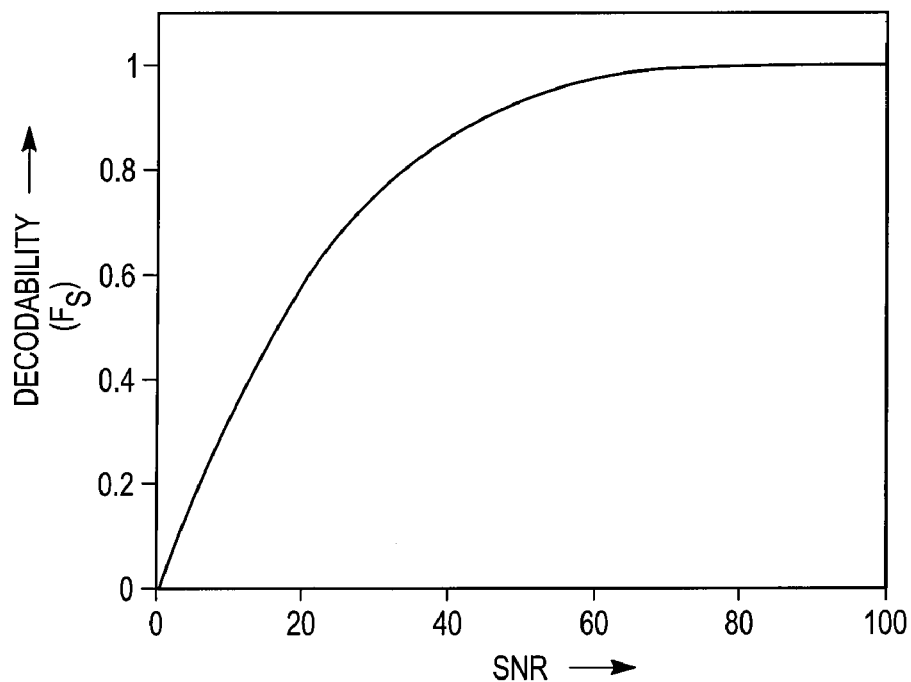
FIG. 4 shows an example of an SNR decodability function.

Generally, the decodability value increases with the signal-to-noise ratio of the captured image. That is, the better the signal-to-noise ratio, the easier to decode a barcode. FIG. 4 shows an example of an SNR decodability function, where the decodability value is plotted versus the signal-to-noise ratio under certain standard conditions or experimental settings. In FIG. 4, all decodability values are normalized to the reference decodability value when the signal-to-noise ratio is equal to 100. In one example, if time $T_{snr}(100)$ is the time required to decode the barcode when the signal-to-noise ratio is equal to 100 and time $T_{snr}(x)$ is the time required when the signal-to-noise ratio is equal to a value x, then, the normalized decodability value will be equal to $T_{snr}(100)/T_{snr}(x)$ for a signal-to-noise ratio with the value x.

In some implementations, the SNR decodability function can be modeled by a monotonic function that increases with the signal-to-noise ratio. In other implementations, the SNR decodability function can be modeled by a lookup table which has multiple entries each including a value of the signal-to-noise ratio and a corresponding decidability value.

Figure 5:
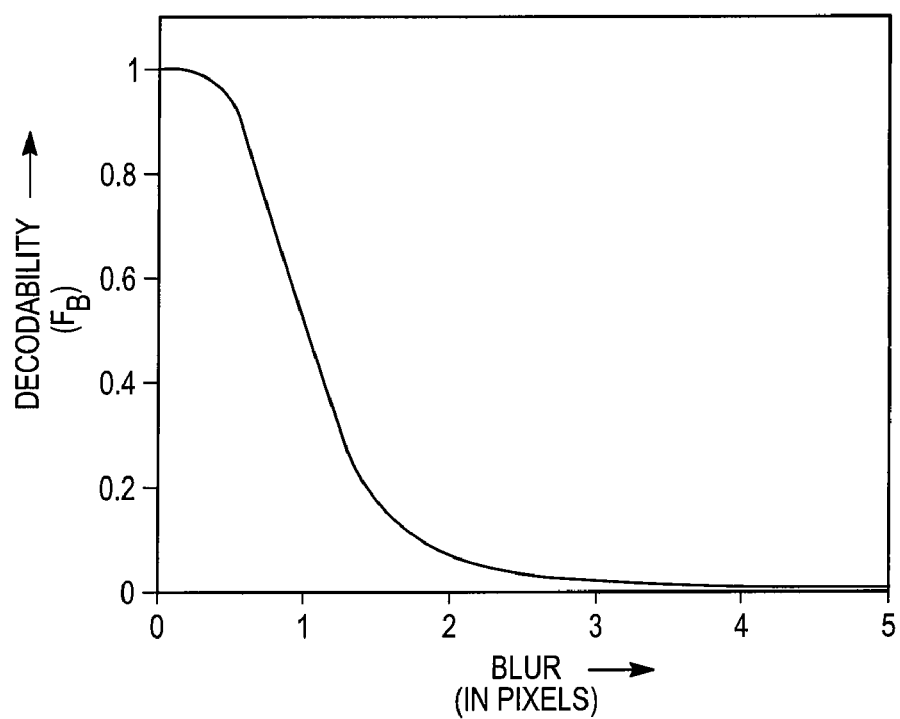
FIG. 5 shows an example of a blur decodability function.

In FIG. 3, at the block 120, a blur decodability function is determined. The blur decodability function is a function that enables a decodability value be determined from a blur value. Generally, the decodability value decreases with the blur value of the captured image. That is, the smaller the blur value, the easier to decode a barcode. FIG. 5 shows an example of a blur decodability function, where the decodability value is plotted versus the blur value under certain standard conditions or experimental settings. In FIG. 5, all decodability values are normalized to the reference decodability value when the blur value is equal to zero. In one example, if time $T_b(0)$ is the time required to decode the barcode when the blur value is equal to zero and time $T_b(y)$ is the time required when the blur value is equal to a value y, then, the normalized decodability value will be equal to $T_b(0)/T_b(y)$ for a blur value with the value y.

In some implementations, the blur decodability function can be modeled by a monotonic function that decreases with the blur value. In other implementations, the SNR decodability function can be modeled by a lookup table which has multiple entries each including blur value and a corresponding decidability value.

In FIG. 3, at the block 130, a blur and a signal-to-noise ratio is measured for an image captured with a first exposure time. There are several methods for determining the signal-to-noise ratio. In one implementation, the method for determining the signal-to-noise ratio includes (1) creating the median image from the captured image, (2) comparing the median image with the original captured image (i.e. finding the difference), and (3) computing the signal-to-noise ratio as the standard variation of the noise. In another implementation, the method for determining the signal-to-noise ratio includes (1) dividing the captured image into multiple segments, and (2) computing the signal-to-noise ratio as the standard variation of the total noise in those segments containing non-edge pixels. There are several methods for determining the blur. In some implementations, the blur is determined from a single captured image. In other implementations, the blur is determined from a pair of captured images. The blur variable used in the method 100 for estimating the exposure time is generally dominated by motion blur, which generally can be determined from the optical flow. The method for determining the optical flow can includes (1) capturing two consecutive images within a short time period and (2) determining the motion field that best describes the change between these two captured images. The computation of optical flow generally can be performed efficiently through software or dedicated hardware.

At the block 140, the optimized exposure time is determined based on the measured blur, the measured signal-to-noise ratio, and a combined decodability function. The combined decodability function depends upon both the SNR decodability function and the blur decodability function. In some implementations, the combined decodability function is a product of the SNR decodability function and the blur decodability function.

In some implementations, the optimized exposure time can be determined using a time-variable combined decodability function. The time-variable combined decodability function is a function that enables to a decodability value be determined from an exposure time. Generally, the time-variable combined decodability function reaches a maximum decidability value at certain value of exposure time, and this value of exposure time can be selected as the optimized exposure time.

In one implementation, for determining the time-variable combined decodability function, a signal-to-noise ratio function is determined with the measured signal-to-noise, and a blur function is determined with the measured blur.

Figure 6A:
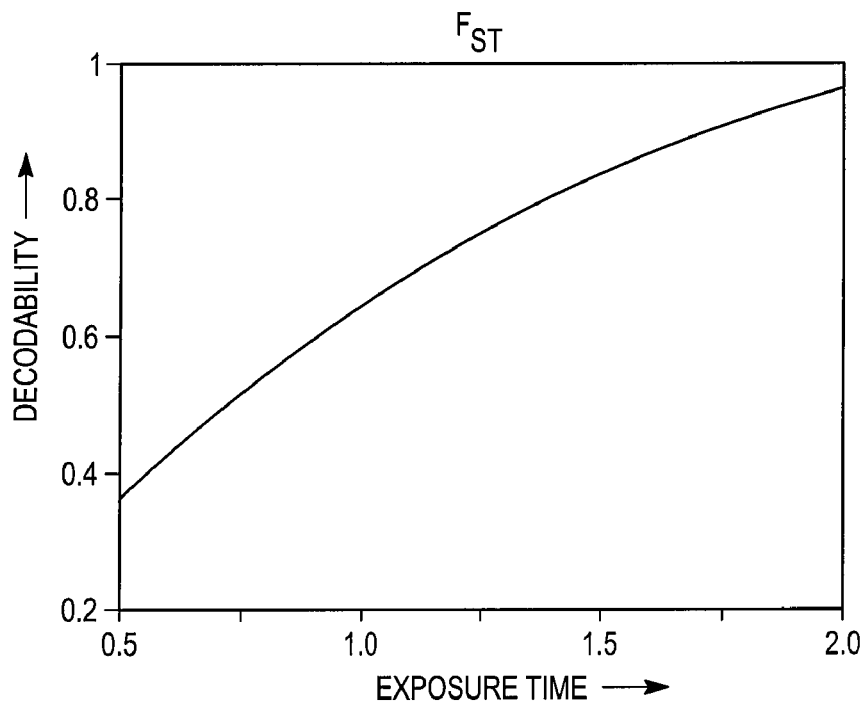
FIG. 6A provides an example of a time-variable SNR decodability function.

The signal-to-noise ratio function is a function that enables a signal-to-noise ratio be determined from an exposure time. Such function enables the SNR decodability function obtained at the block 110 be converted into a time-variable SNR decodability function. In one example, the signal-to-noise ratio function is provided by a linear function and the signal-to-noise ratio is directly proportional to the exposure time, that is, $s=c_s \cdot t$. This signal-to-noise ratio function can be determined with the measured signal-to-noise so when the exposure time is set to the first exposure time $t_0$, because $c_s$ can be determined as $c_s=s_0/t_0$. The signal-to-noise ratio $s(t)$ at any exposure time t is given by $s(t)=(s_0/t_0) \cdot t$. The SNR decodability function $F_s(s)$ obtained at the block 110 can be converted into a time-variable SNR decodability function $F_{st}(t)$. For the above example with the linear signal-to-noise ratio function $s=c_s \cdot t$, the time-variable SNR decodability function $F_{st}(t)$ can be obtained from equation $F_s(s)=F_s(c_s t)=F_{st}(t)$. FIG. 6A provides an example of the time-variable SNR decodability function $F_{st}(t)$. In FIG. 6A, the vertical axis is the decidability, and the horizontal axis is the exposure time in unit of the first exposure time $t_0$.

Figure 6B:
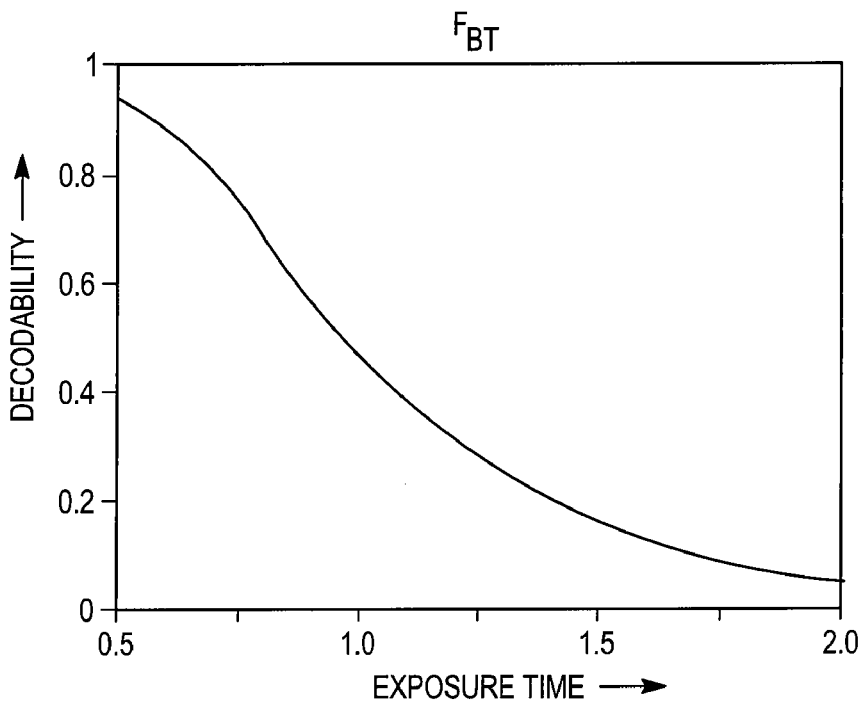
FIG. 6B provides an example of a time-variable blur decodability function.

The blur function is a function that enables a blur value be determined from an exposure time. Such function enables the blur decodability function obtained at the block 120 be converted into a time-variable blur decodability function. In one example, the blur function is provided by a linear function and the blur is directly proportional to the exposure time, that is, $b=c_b \cdot t$. This blur function can be determined with the measured blur $b_0$ when the exposure time is set to the first exposure time $t_0$, because $c_b$ can be determined as $c_b=b_0/t_0$. The blur $b(t)$ at any exposure time t is given by $b(t)=(b_0/t_0) \cdot t$. The blur decodability function $F_b(b)$ obtained at the block 120 can be converted into a time-variable blur decodability function $F_{bt}(t)$. For the above example with the linear signal-to-noise ratio function $b=c_b \cdot t$, the time-variable blur decodability function $F_{bt}(t)$ can be obtained from equation $F_b(b)=F_b(c_{bt})=F_{bt}(t)$. FIG. 6B provides an example of the time-variable blur decodability function $F_{bt}(t)$. In FIG. 6B, the vertical axis is the decidability, and the horizontal axis is the exposure time in unit of the first exposure time $t_0$.

Figure 6C:
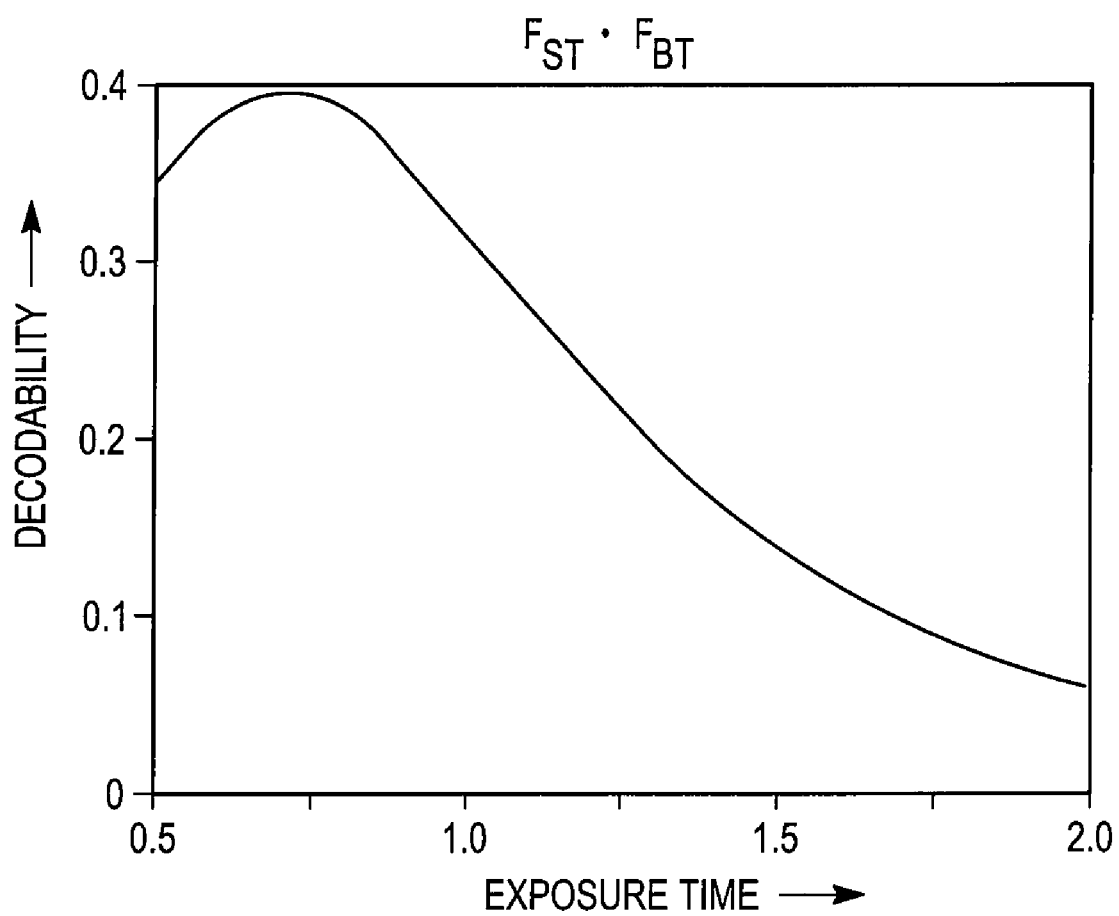
FIG. 6C provides an example of a time-variable combined decodability function.

In general, the time-variable combined decodability function $F(t)$ can be determined from the time-variable SNR decodability function $F_{st}(t)$ and the time-variable blur decodability function $F_{bt}(t)$. In one implementation, the time-variable combined decodability $F(t)$ is a product of the time-variable SNR decodability function $F_{st}(t)$ and time-variable blur decodability function $F_{bt}(t)$. FIG. 6C provides an example of the time-variable combined decodability function $F(t)=F_{st}(t) \cdot F_{bt}(t)$, where $F_{st}(t)$ is the time-variable SNR decodability function $F_{st}(t)$ as shown in FIG. 6A and $F_{bt}(t)$ is the time-variable blur decodability function $F_{bt}(t)$ as shown in FIG. 6B. In FIG. 6C, the vertical axis is the decidability, and the horizontal axis is the exposure time in unit of the first exposure time to. In FIG. 6C, the time-variable combined decodability function $F(t)$ reaches the maximum value when the exposure time $t \approx 0.71\ t_0$. Therefore, the optimized exposure time can be set at about $0.71\ t_0$.

FIG. 6A, FIG. 6B and FIG. 6C provided one exemplary implementation in which the optimized exposure time can be determined using a time-variable combined decodability function. Other implementations are also possible.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of estimating an optimized exposure time for an imaging-based barcode scanner comprising:
    determining a SNR decodability function that enables a decodability value be determined from a signal-to-noise ratio;
    determining a blur decodability function that enables a decodability value be determined from a blur value;
    measuring a blur and a signal-to-noise ratio for an image captured with a first exposure time; and
    determining the optimized exposure time based on the measured blur, the measured signal-to-noise ratio, and a combined decodability function that depends upon both the SNR decodability function and the blur decodability function.

2. The method of claim 1, wherein the combined decodability function is a product of the SNR decodability function and the blur decodability function.

3. The method of claim 1, wherein the SNR decodability function comprises a monotonic function that increases with the signal-to-noise ratio.

4. The method of claim 1, wherein the SNR decodability function comprises a lookup table having multiple entries each including a value of the signal-to-noise ratio and a corresponding decidability value.

5. The method of claim 1, wherein the blur decodability function comprises a monotonic function that decreases with the blur value.

6. The method of claim 1, wherein the blur decodability function comprises a lookup table having multiple entries each including a blur value and a corresponding decodability value.

7. The method of claim 1, further comprising:
    determining a signal-to-noise ratio function with the measured signal-to-noise, wherein the signal-to-noise ratio function enables a signal-to-noise ratio be determined from an exposure time; and
    determining a blur function with the measured blur, wherein the blur function enables a blur value be determined from an exposure time.

8. The method of claim 7, wherein the determining an optimized exposure time comprises:
    finding the optimized exposure time using a time-variable combined decodability function that that maps an exposure time to a corresponding decodability value.

9. A barcode scanner for imaging target objects comprising:
    an illumination source for providing illumination directed toward a target object;
    a photodetector array located within the barcode scanner for capturing images from the target object; and
    a microprocessor having operation codes therein to determine a SNR decodability function that enables a decidability value be determined from a signal-to-noise ratio, determine a blur decodability function that enables a decodability value be determined from a blur value, and determine an optimized exposure time based on a measured blur, a measured signal-to-noise ratio, and a combined decodability function that depends upon both the SNR decodability function and the blur decodability function.

10. The barcode scanner of claim 9, wherein the combined decodability function is a product of the SNR decodability function and the blur decodability function.

11. The barcode scanner of claim 9, wherein the SNR decodability function comprises a monotonic function that increases with the signal-to-noise ratio.

12. The barcode scanner of claim 9, wherein the SNR decodability function comprises a lookup table having multiple entries each including a value of the signal-to-noise ratio and a corresponding decodability value.

13. The barcode scanner of claim 9, wherein the blur decodability function comprises a monotonic function that decreases with the blur value.

14. The barcode scanner of claim 9, wherein the blur decodability function comprises a lookup table having multiple entries each including a blur value and a corresponding decodability value.

15. The barcode scanner of claim 9, wherein the microprocessor has operation codes therein to:

determine a signal-to-noise ratio function with the measured signal-to-noise, wherein the signal-to-noise ratio function enables a signal-to-noise ratio be determined from an exposure time; and determine a blur function with the measured blur, wherein the blur function enables a blur value be determined from an exposure time.

16. The barcode scanner of claim 15, wherein the microprocessor has operation codes therein to:

find the optimized exposure time using a time-variable combined decodability function that maps an exposure time to a corresponding decodability value.

* * * * *

UNITED STATES PATENT AND TRADEMARK OFFICE
CERTIFICATE OF CORRECTION

PATENT NO. : 8,245,937 B2
APPLICATION NO. : 12/549060
DATED : August 21, 2012
INVENTOR(S) : Vinogradov et al.

Page 1 of 1

It is certified that error appears in the above-identified patent and that said Letters Patent is hereby corrected as shown below:

In Column 8, Line 31, in Claim 8, delete "that that maps" and insert -- that maps --, therefor.

Signed and Sealed this
Fifth Day of February, 2013

Teresa Stanek Rea
*Acting Director of the United States Patent and Trademark Office*